(12) United States Patent
Yanik et al.

(10) Patent No.: US 7,116,864 B2
(45) Date of Patent: Oct. 3, 2006

(54) STOPPING AND TIME REVERSING LIGHT IN A WAVEGUIDE WITH AN ALL-OPTICAL SYSTEM

(75) Inventors: Mehmet Fatih Yanik, Stanford, CA (US); Wonjoo Suh, Stanford, CA (US); Zhang Wang, Stanford, CA (US); Shanhui Fan, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/000,679

(22) Filed: Nov. 30, 2004

(65) Prior Publication Data

US 2006/0115211 A1 Jun. 1, 2006

(51) Int. Cl.
*G02B 6/26* (2006.01)
*G02F 1/295* (2006.01)

(52) U.S. Cl. ............................................. 385/27; 385/8

(58) Field of Classification Search ................... 385/8, 385/15, 27
See application file for complete search history.

(56) References Cited

U.S. PATENT DOCUMENTS

2003/0231826 A1* 12/2003 Boyd et al. ................... 385/27
2005/0248823 A1* 11/2005 Maleki et al. ............... 359/245

OTHER PUBLICATIONS

Boiler, K. J., et al, "Observation of Electromagnetically Induced Transparency", *Phys. Rev. Lett.* 66, 2593 (1991).

Lukin, M. D. and Imamoglu, A. "Controlling photons using electromagnetically induced transparency", *Nature*, 413,273 (2001).
Duan, L. M. et al, "Long-distance quantum communication with atomic ensembles and linear optics", *Nature* 414,413 (2001).
Kasapi A., et al, "Electromagnetically Induced Transparency: Propagation Dynamics", *Phys. Rev. Lett.* 74,2447 (1995).
Hau, L. V., et al. "Light speed reduction to 17 metres per second in a ultracold atomic gas", *nature* 397, 594 (1999).
Kash, M. M., et. al "Ultraslow Group Velocity and Enhanced Nonlinear Optical Effects in a Coherently Driven Hot Atomic Gas", *Phys. Rev. Lett.* 82, 5229 (1999).
Budker, D., et al "Nonlinear Magneto-Optics and Reduced Group Velocity of Light in Atomic Vapor with Slow Ground State Relaxation", *Phys. Rev. Lett.* 83, 1767 (1999).
Liu, C., et al. "Observation of coherently optical information in an atomic medium using halted light pulses", *Nature* 409, 490 (2001).
Phillips, D. F., et al., "Storage of Light in Atomic Vapor", *Phys. Rev. Lett.*86, 783 (2001).

(Continued)

*Primary Examiner*—Sung Pak
*Assistant Examiner*—Tina M. Wong
(74) *Attorney, Agent, or Firm*—Parsons Hsue & de Runtz LLP

(57) ABSTRACT

We introduce a new all-optical mechanism that can compress the bandwidth of light pulses to absolute zero, and bring them to a complete stop. The mechanism can be realized in a system consisting of a waveguide side-coupled to tunable resonators, which generates a photonic band structure that represents a classical analogue of the Electromagnetically Induced Transparency. The same system can also achieve a time-reversal operation. We demonstrate the operation of such a system by finite-difference time-domain simulations of an implementation in photonic crystals.

19 Claims, 3 Drawing Sheets

OTHER PUBLICATIONS

Turukhin, A. V., et. al, "Observation of Ultraslow and Stored Light Pulses in a Solid", *Phys. Rev. Lett.* 88, 236021 (2002).

Bigelow, M.S., et al, "Superluminal and Slow Light Propagation in a Room-temperature Solid", *Phys. Rev. Lett.* 90,113903 (2003).

Yamamoto, Y. et al., "Optical Processes in Microcavities", *Phys. Today* 46, 66 (1993).

Yablonovitch, E., "Inhibited Spontaneous Emission in Solid-State Physics and Electronics", *Phys. Rev. Lett.* 58, 2059-2062 (1987).

John, S., "Strong Localization of Photons in Certain Disordered Dielectric Superlattices", *Phys. Rev. Lett.* 58, 2486-2489 (1987).

Notomi, M., et. al., "Extremely Large Group-Velocity Dispersion of Line-Defect Waveguides in Photonic Crystals Slabs", *Phys. Rev. Lett.* 87, 253902 (2001).

Stefanou, N. et al., "Impurity bands in photonic insulators", *Phys. Rev. B 57*, 12127 (1998).

Yariv, A. et al., "Coupled-resonator optical waveguide: a proposal and analysis", *Opt. Lett.* 24, 711-713 (1999).

Bayindir, M. et al., Tight Binding Description of the Coupled Defect Modes in Three Dimensional Photonic Crystals, *Phys. Rev. Lett.* 84, 2140-2143 (2000).

Lenz, G. et al., "Optical Delay Lines Based on Optical Filters", *IEEE Journal of Quantum Electronics* 37, 525 (2001).

Fink, M. "Time reversal of Ultrasonic Fields-Part I: Basic Principles", *IEEE Trans. Ultrason., Ferroelec, Freq. Contr.*, 39, 555 (1992).

F. Wu, et al, "Time reversal of Ultrasonic fields-Part II: Experimental Results", *IEEE Trans. Ultrason. Ferroelec, Freq. Contr.*, 39, 567 (1992).

Freund, I. "Time-reversal symmetry and image reconstruction through multiple-scattering media", *J. Opt. Soc. Am.* A, 9, 456, 1992.

de Rosny, J., et al, "Overcoming the Diffraction Limit in Wave Physics Using a Time-Reversal Mirror and a Novel Acoustic Sink", *Phys. Rev. Lett.* 89,124301 (2002).

Marom, D. J., et al. "Real-Time Spatial-Temporal Signal Processing with Optical nonlinearities", *IEEE Journal of Quantum Elec*, 7, 683 (2001).

Armani, D. K., et al. "Ultra-high-Q toroid microcavity on a chip", *Nature*, vol. 421, Feb. 2003.

Reed, E. J., et al., "Color of Shock Waves in Photonic Crystals", *Phys. Rev. Lett*, vol. 90, No. 20, (2003).

Noda, S. et al., "Trapping and emission of photons by a single defect in a photonic bandgap structure", Nature, vol. 407, Oct. 2000.

André, A. et al., "Manipulating Light Pulses via Dynamically Controlled Photonic Band gap", *Phys. Rev. Lett*, vol. 89, No. 4 (2002).

Y. Xu et al. "Scattering-theory analysis of waveguide-resonator coupling", *Phys. Rev. E* 62, 7389 (2000).

Yanik, M. F., Fan, S et al., "All Optical Transistor Action with bistable switching in a photonic crystal cross-waveguide geometry," *Optics Letters*, vol. 28, pp. 2506-2508 (2003).

Soljacic et al., "Photonic-crystal slow-light enhancement of non-linear phase sensitivity", *J. Opt. Soc. Am.* B/vol. 9 Sep. 2002.

Yanik M. F., S. Fan, "Stopping Light All Optically", *Phys. Rev. Lett.* 92, 083901 (2004).

Schmidt-Kaler, F. et. al. "Realization of the Cirac-Zoller controlled-NOT quantum gate", *Nature*, vol. 422, 408-411 (2003).

Yanik, M. F. et al., "Stopping Light in a Waveguide with an All-Optical Analog of Electromagnetically Induced Transparency", *Phys. Rev. Lett*, 93, 233903, (2004).

Yanik, M. F., Fan, S. "Time Reversal of Light with Linear Optics and Modulators", *Phys. Rev. Lett*, vol. 93, No. 17, (2004).

Lukin, M.D. et al., "Entanglement of Atomic Ensembles by Trapping Correlated Photon States", *Phys. Rev. Lett*, vol. 84, No. 18 (2000).

Reed, E. J., "Reversed Doppler Effect In Photonic Crystals", *Phys. Rev. Lett*, vol. 91, No. 13, (2003).

Yanik, M. F., et al., "Stopping and storing Light Coherently", *Physical Review* A71, 013803 (2005).

U.S. Appl. No. 11/001,492, "Ultra-slow down and storage of light pulses, and altering of pulse spots", filed Nov. 30, 2004.

Yanik, M. F. et al., "On-Chip All-Optical Stopping and Coherent Storage of Light", Gintzon Laboratory, Stanford University.

* cited by examiner

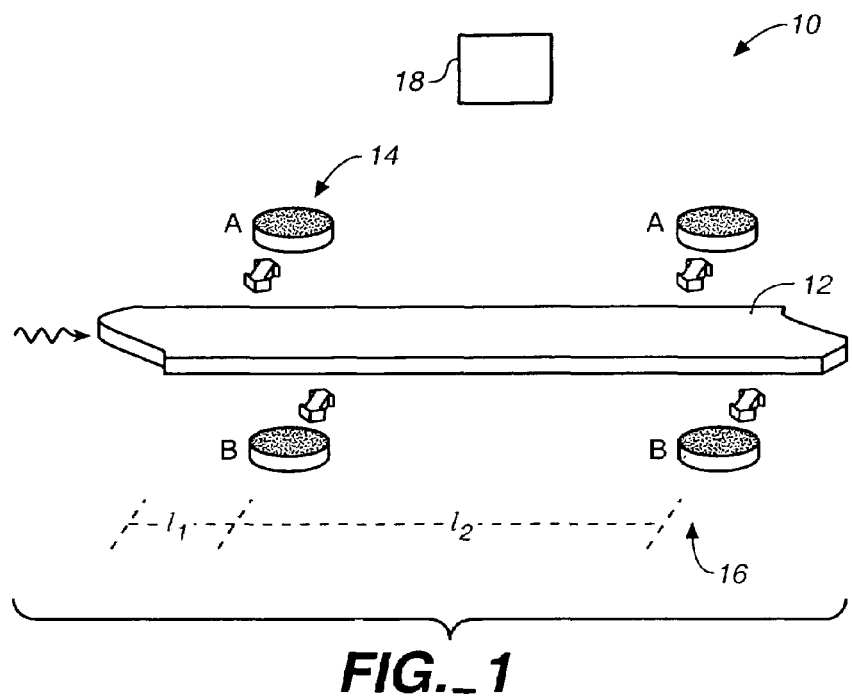
FIG._1
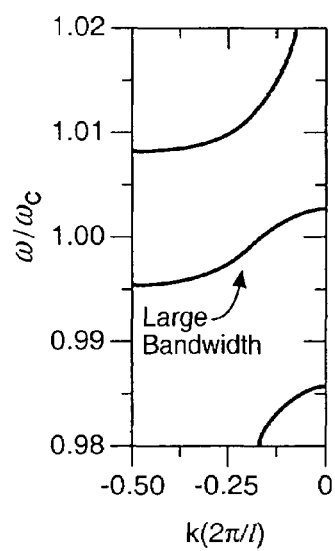
FIG._2a
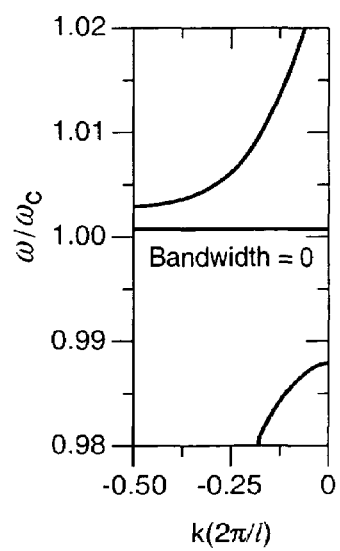
FIG._2b
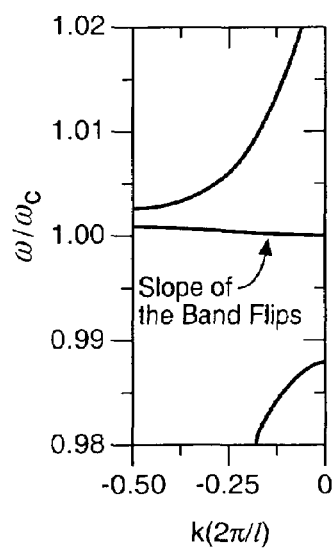
FIG._2c

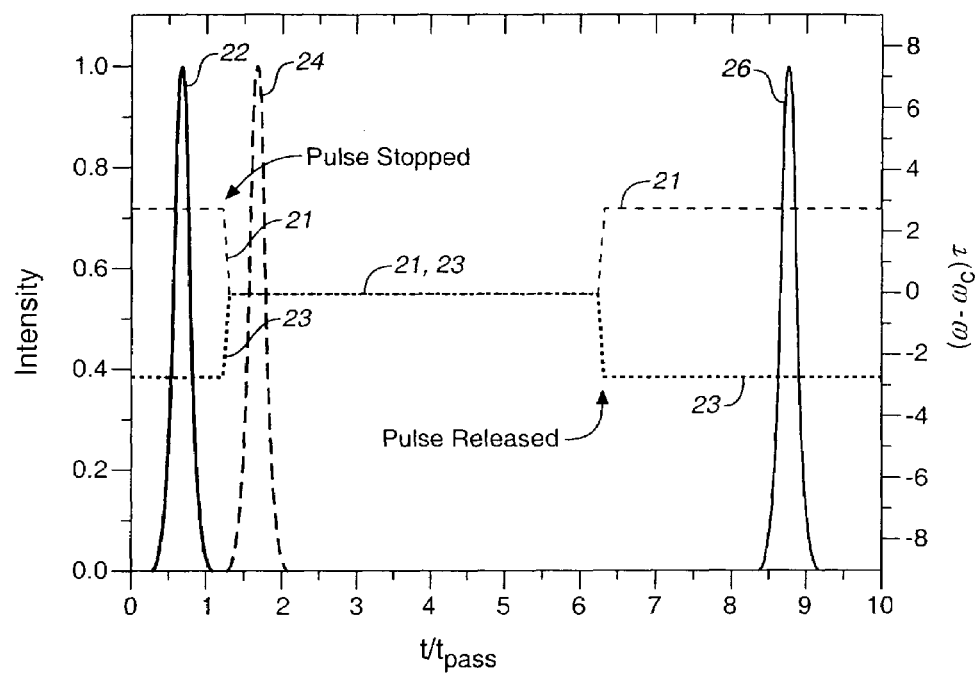
FIG._3a

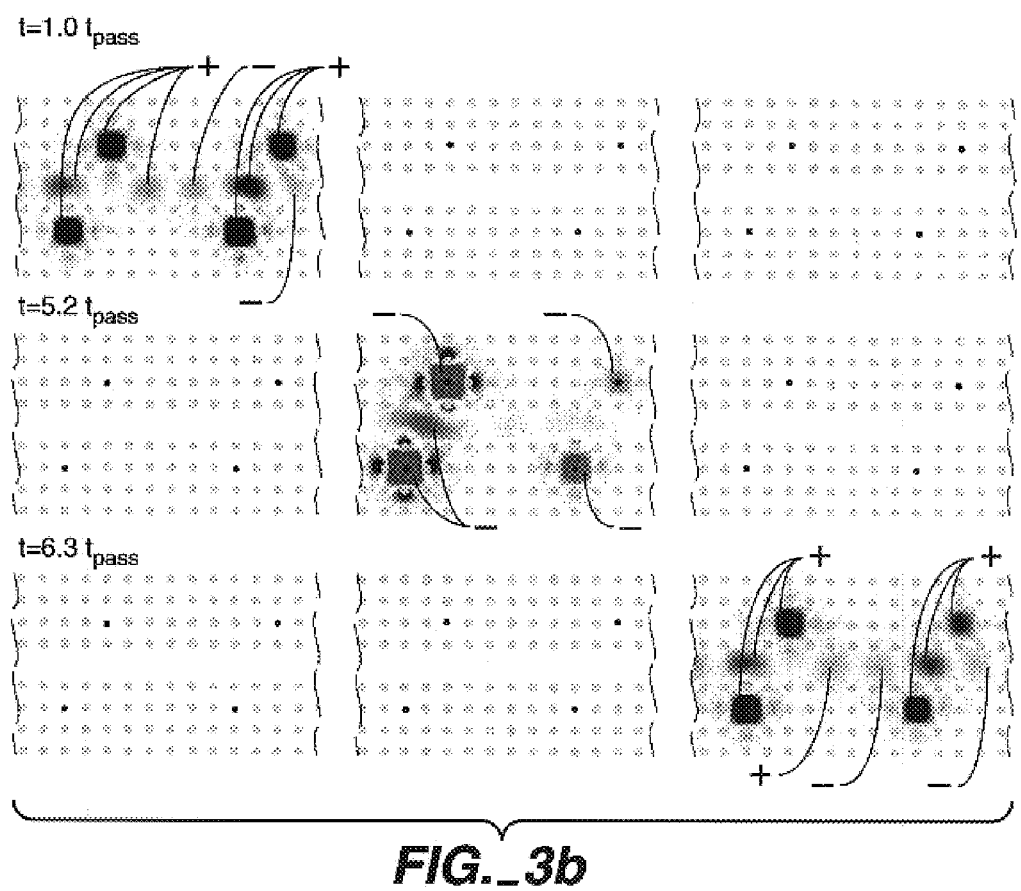
FIG._3b

STOPPING AND TIME REVERSING LIGHT IN A WAVEGUIDE WITH AN ALL-OPTICAL SYSTEM

This invention was supported in part by a National Science Foundation (NSF) grant NSF-NRAC, grant number ECS-0200445. The United States Government has rights in this invention.

CROSS-REFERENCE TO RELATED APPLICATION

This application is related to Application No. 11/001,492, filed Nov. 30, 2004. entitled "Ultra-slow Down and Storage of Light Pulses, and Altering of Pulse Spectrum," by Mehmet Fatih Yanik and Shanhui Fan. The related application is incorporated by reference in its entirety.

BACKGROUND OF THE INVENTION

The ability to stop a light pulse, while completely preserving quantum coherent information encoded in the pulse, has profound implications for classical and quantum information processing See R. Ramaswami, K. N. Sivarajan, Optical Networks: "A Practical Perspective", Morgan Kaufmann, San Francisco, Calif., 1998; M. D. Lukin, A. Imamoglu, Nature 413, 273 (2001); L. M. Duan, M. D. Lukin, J. I. Cirac, P. Zoller, Nature, 414, 413 (2001); M. Fleischhauer, M. D. Lukin, Phys. Rev. A. 65, 022314 (2002); and M. F. Yanik, S. Fan, Phys. Rev. Lett. 92, 083901 (2004). Up to now, most experimental demonstrations of stopping light rely upon the use of Electromagnetic Induced Transparency (EIT). In these experiments, a light pulse is stopped by completely or partially transferring the optical information to coherent electronic states See M. D. Lukin, S. F. Yelin, and M. Fleischhauer, Phys. Rev. Lett. 84, 4232 (2000); C. Liu, Z. Dutton, C. H. Behroozi, L. V. Hau, Nature 409, 490 (2001); and D. F. Phillips, A. Fleischhauer, A. Mair, R. L. Walsworth, M. D. Lukin, Phys. Rev. Lett. 86, 783 (2001). The use of electronic states, however, severely limits applications, due to the stringent conditions required to maintain electronic coherence.

Since EIT spectrum results from the interference of resonant pathways, it has been recently recognized that similar interference effects also occur in classical systems such as plasma and electric circuits. See S. E. Harris, Phys. Rev. Lett. 77, 5357 (1996); and A. G. Litvak, M. D. Tokman, Phys. Rev. Lett. 88, 095003 (2002). In particular, EIT-like transmission spectra have been observed in static optical resonators. See D. D. Smith, H. Chang, K. A. Fuller, A. T. Rosenberger, R. W. Boyd, Phys. Rev. A 69, 63804 (2004); L. Maleki, A. B. Matsho, A. A. Savchenkov, V. S. Ilchenko, Opt. Lett. 29, 626 (2004); and W. Suh, Z. Wang, S. Fan, IEEE J. Quantum Electronics (in press). To stop light, however, a static resonator system alone is not sufficient— any such resonator system is fundamentally limited by the delay-bandwidth constraint [see G. Lenz, B. J. Eggleton, C. K. Madsen, R. E. Slusher, IEEE J. Quantum Electronics 37, 525 (2001); and Z. Wang, S. Fan, Phys. Rev. E, 68, 066616 (2003)] and cannot bring the group velocity of an optical pulse to zero. See M. F. Yanik, S. Fan, Phys. Rev. Lett. 92, 083901 (2004); and M. F. Yanik, S. Fan, submitted to Phys. Rev. A. Critically, one needs to develop the correct dynamic process that allows the bandwidth of the pulse to be adiabatically compressed to zero. See M. F. Yanik, S. Fan, Phys. Rev. Lett. 92, 083901 (2004); and M. F. Yanik, S. Fan, submitted to Phys. Rev. A. Yanik and Fan recently showed one such dynamic process based upon band anticrossing mechanism in Coupled Resonator Optical Waveguides (CROW) See M. F. Yanik, S. Fan, Phys. Rev. Lett. 92, 083901 (2004).

SUMMARY OF THE INVENTION

We propose a system for affecting a wave pulse of a type, said pulse having frequency components. A medium having a bandwidth that can initially accommodate the frequency components of the wave pulse at a group velocity is employed. The medium comprises a waveguide and a first and a second linear sequence of resonators, each sequence side coupled to the waveguide. The spectrum of the pulse is altered after the pulse has entered the medium so that information in the pulse is substantially preserved, wherein the pulse is of said type before and after the alteration, so that the spectrum of the pulse is modulated.

BRIEF DESCRIPTION OF THE DRAWINGS

FIG. 1 is a schematic view of a tunable waveguide system used to stop light to illustrate one embodiment of the invention. The disks A and B and block 12 represent the cavities and the waveguide respectively. The arrows indicate available evanescent coupling pathways between the cavities and the waveguide. The system consists of a periodic array of two side-cavities coupled to waveguide, with a coupling rate of $1/\tau$. The distance between the nearest neighbor side cavities is $l_1$, and the length of the unit cell is $l=l_1+l_2$.

FIGS. 2(a), 2(b) and 2(c) are graphical plots of the photonic bands of the system of FIG. 1 for three different choices of $\Delta \equiv |\omega_A - \omega_B|\tau$. FIG. 2(a) $\Delta=3.277$. The bandwidth of the middle band is large. FIG. 2(b) $\Delta \approx 0.341$. The bandwidth goes to zero. FIG. 2(c) $\Delta=0$. The slope of the band flips its sign. The cavity resonance frequencies are given by $\omega_{A,B}=\omega_c \mp \Delta/2\tau$, where $\omega_c=0.357\cdot(2\pi c/a)$ and $1/\tau=\omega_c/235.8$. Here, a is a length unit. The distances between the cavities are $l_1=2a$ and $l=8a$. The waveguide has a dispersion of $\beta=[0.278+0.327\ (\omega a/2\pi c-2.382)]/a$, which is actually a fit for the photonic crystal waveguide in FIGS. 3a and 3b.

FIGS. 3a and 3b illustrate propagation of an optical pulse through a waveguide-resonator complex in a photonic crystal system as the resonant frequencies of the cavities are varied. The photonic crystal consists of 100 cavity pairs. Fragments of the photonic crystal are shown in part b. The three fragments correspond to unit cells 12–013, 55–56, 97-98. The dots indicate the positions of the dielectric rods. The black dots represent the cavities.

In FIG. 3(a), the dashed lines 21 and 23 represent the variation of $\omega_A$ and $\omega_B$ as a function of time, respectively. The solid line 22 is the intensity of the incident pulse as recorded at the beginning of the waveguide. The dashed line 24 and solid line 26 represent the intensity at the end of the waveguide, in the absence and the presence of modulation, respectively. FIG. 3 (b) are snapshots of the electric field distributions in the photonic crystal at the indicated times. The darkened areas represent large positive (marked "+") and negative (marked "−") electric fields.

DETAILED DESCRIPTION OF THE EMBODIMENTS

We theoretically and numerically demonstrate a new and optimal mechanism for stopping light, by constructing a system comprising a waveguide side-coupled to optical resonators, and by modulating the refractive index of the resonators to dynamically compress photon bandwidth. We prove that the group velocity of light can be reduced to absolute zero, with only two resonators per unit cell, due to the presence of EIT-like interference effects. We also show that in such a system, the adiabatic bandwidth compression process is protected by the presence of a large photonic band gap, which makes a fast compression process possible.

We consider a translationally invariant system 10 (FIG. 1), in which a waveguide 12 is coupled to two side-cavities (A and B) in each of the two unit cells 14 and 16. The system may comprise more than two unit cells of the same construction. The cavities A of such cells then form a linear sequence of resonators, and so do cavities B in such cells. The cavities A and B have resonant frequencies $\omega_A$ and $\omega_B$ respectively. Initially, we assume that the cavities couple to the waveguide with equal rate of $1/\tau$, and we ignore the direct coupling between the side-cavities. The transmission matrix for a waveguide side coupled to a single resonator with resonance frequency $\omega_i$ can be calculated using the Green's function method. See S. Fan et. al. Phys. Rev. B 59, 15882 (1999).

as:

$$T_{c_i} = \begin{pmatrix} 1 + j/(\omega - \omega_i)\tau & j/(\omega - \omega_i)\tau \\ -j/(\omega - \omega_i)\tau & 1 - j/(\omega - \omega_i)\tau \end{pmatrix} \quad (1)$$

The transmission matrix through an entire unit cell in FIG. 1 can then be determined as:

$$T = T_{c_1} T_{l_1} T_{c_2} T_{l_2} \quad (2)$$

where $$T_{l_i} = \begin{pmatrix} e^{j\beta l_i} & 0 \\ 0 & e^{j\beta l_i} \end{pmatrix}$$

is the transmission matrix for a waveguide section of length $l_i$; Here, $\beta$ is the wavevector of the waveguide at a given frequency $\omega$.

Since $\det(T)=1$, the eigenvalues of T can be represented as $e^{ikl}, e^{-ikl}$, where $l=l_1+l_2$ is the length of the unit cell, and k (when it is real) corresponds to the Bloch wavevector of the entire system. Therefore, we obtain the band diagram of the system as:

$$\frac{1}{2} Tr(T) = \cos(kl) = f(\omega) \equiv \cos(\beta l) + \frac{C_+}{(\omega - \omega_A)} + \frac{C_-}{(\omega - \omega_B)} \quad (3)$$

where $$C_\pm = \frac{2 \sin(\beta l_1) \sin(\beta l_2)}{(\omega_A - \omega_B)\tau^2} \pm \frac{\sin(\beta l)}{\tau}.$$

In the frequency range where $|f(\omega)|<1$, the system supports propagating modes, while $|f(\omega)|>1$ corresponds to the frequency ranges of the photonic band gaps. For a large frequency separation $\Delta = |\omega_A - \omega_B|\tau$, the band diagram is shown in FIG. 2a. In the vicinity of the resonances, the system supports three photonic bands, with two gaps occurring around $\omega_A$ and $\omega_B$. Such a band diagram is similar to that of EIT systems. See G. Juzeliunas, H. J. Carmichael, Phys. Rev. A 65, 021601R (2002).

The width of the middle band depends strongly on the resonant frequencies $\omega_A$, $\omega_B$. Importantly, when the resonant frequencies satisfy the following conditions, the width of the middle band becomes zero (FIG. 2b), with the frequency of the entire band pinned at $\omega_A$:

$$C_+(\omega_A) = \frac{2 \sin[\beta(\omega_A)l_1]\sin[\beta(\omega_A)l_2]}{(\omega_A - \omega_B)\tau^2} + \frac{\sin[\beta(\omega_A)l]}{\tau} \to 0 \quad (4)$$

$$\left| \cos[\beta(\omega_A)l] + \frac{C_-(\omega_A)}{\omega_A - \omega_B} \right| > 1 \quad (5)$$

(Alternatively, the band can be pined at $\omega_B$ with a similar condition). To prove these conditions, we note that $f(\omega)$ in Eq. (3) has a singularity at $\omega = \omega_A$. The frequency width of this singularity is controlled by $C_+(\omega_A)$, and approaches zero when Eq. (4) is satisfied. Satisfying Eq. (5), on the other hand, ensures that the solutions to $|f(\omega)| \leq 1$ in the vicinity of $\omega_A$ occurs on the same branch of the singularity $1/(\omega - \omega_A)$, and thus forms a continuous band. When both conditions are satisfied, as the width of the singularity approaches zero, a band (the middle band in FIG. 2b) always exists in the vicinity of $\omega_A$, and the width of this middle band vanishes. Upon further decrease of $\Delta$, the group velocity of the band changes sign (FIG. 2c). Furthermore, the sign of the group velocity for the middle band can be designed by choosing appropriate $l_1$, $l_2$.

In the presence of direct coupling due to photon tunneling between the two cavities in the same unit cell, one could still describe the system in terms of two resonant eigenstates within each unit cell. The dispersion can be expressed in the same functional form as of equation (3) with $\omega_A$ and $\omega_B$ in the denominator replaced by the frequencies of the eigenstates. And bandwidth compression to zero still occurs when $\Delta$ satisfies conditions analogous to that of equations (4) & (5). This is also supported by our numerical observations that the sign of the band flips. In addition, in photonic crystals the direct coupling constant decreases exponentially with the distance between the cavities, and can therefore be reduced to any desired value in our system since the cavities are not across each other along the waveguide. Our simulations also indicate that even in the presence of loss, extremely flat band is obtainable, and the sign of the band still flips, which is consistent with our previous finding in a different system. See M. F. Yanik, S. Fan, Phys. Rev. Lett. 92, 083901 (2004). In general, it appears that the group velocity becomes independent of the loss when the losses of different sub-systems are matched. See M. F. Yanik, S. Fan, Phys. Rev. Lett. 92, 083901 (2004); and M. F. Yanik, S. Fan, submitted to Phys. Rev. A.

The system presented above satisfies the general criterion required to stop light. See M. F. Yanik, S. Fan, Phys. Rev. Lett. 92, 083901 (2004). The system is translationally invariant, and the width of one of the bands can be reversibly compressed to zero. Thus, the dynamic process in M. F. Yanik, S. Fan, Phys. Rev. Lett. 92, 083901 (2004) can also be applied here to stop a light pulse. We start with large $\Delta$, such that the middle band has a large bandwidth, and $\omega_A$, $\omega_B$ are chosen such that this band can accommodate the incoming pulse, with each spectral component of the pulse occupying a unique wavevector (FIG. 2a). After the pulse is completely in the system, we vary $\omega_A$ and $\omega_B$ until the bandwidth of the band is reduced to zero (FIG. 2b), at a rate slow compared with the frequency separation of the middle band from other bands.

We implement the system presented above in a photonic crystal of a square lattice of dielectric rods (n=3.5) with a radius of 0.2a, (a is the lattice constant) embedded in air (n=1) (FIGS. 3a and 3b). The photonic crystal possesses a band gap for TM modes with electric field parallel to the rod axis. A single-mode waveguide is generated by removing one row of rods along the pulse propagation direction. Decreasing the radius of a rod to 0.1a and the dielectric constant to n=2.24 generates a single mode cavity with resonance frequency at $\omega_c=0.357\cdot(2\pi c/a)$. The nearest neighbor cavities are separated by a distance of $l_1=2a$ along the propagation direction, and the unit cell periodicity is l=8a. The waveguide-cavity coupling occurs through barrier of one rod, with a coupling rate of $1/\tau=\omega_c/235.8$. The resonant frequencies of the cavities are tuned by refractive index modulation of the cavity rods.

We simulate the entire process of stopping light for N=100 pairs of cavities with finite-difference-time-domain (FDTD) method which solves Maxwell's equations without approximation. See A. Taflove and S. C. Hagness, Computational Electrodynamics (Artech House, Norwood Mass. 2000. The computational cell is truncated by uniaxial perfectly matched boundary layers (UPML). Furthermore, we have used a large enough computational cell such that the result is free of any parasitic reflection from the right end of the computational boundary. The dynamic process for stopping light is shown in FIG. 3a. We generate a Gaussian pulse 22 in the waveguide (The process is independent of the pulse shape). The excitation reaches its peak at $t=0.8t_{pass}$, where $t_{pass}$ is the traversal time of the pulse through the unmodulated waveguide. During the pulse generation, the cavities have a large frequency separation. The field is concentrated in both the waveguide and the cavities (FIG. 3b, $t=1.0t_{pass}$), and the pulse propagates at a high speed of $v_g=0.082$ c. After the pulse is generated, we gradually reduce the frequency separation $\Delta$ to zero. During this process, the speed of light is first reduced to zero, and then changes its sign and the pulse starts propagating backwards slowly. (The sequence of the corresponding band structure is shown in FIG. 2). The waveguide 12 is coupled to the resonators A and B with a coupling constant $\beta$, and the alteration in frequency separation may preferably be caused by index modulation as a result of electromagnetic, acoustic or other fields applied by device 18 in a manner as described in the Related Application. The modulation preferably has a rise time of greater than about $1/\beta$. As the bandwidth of the pulse is reduced, the field concentrates in the cavities (FIG. 3b, $t=5.2t_{pass}$). We use an index modulation with a form of $\exp[-t^2/\tau_{mod}^2]$, where $\tau_{mod}=5\tau$. However, almost any modulation pattern and rate would satisfy adiabaticity in this system. When zero group velocity is reached, the photon pulse can be kept in the system as a stationary waveform for any time duration. In this simulation, we store the pulse for a time delay of $5.0t_{pass}$, and then release the pulse by repeating the same index modulation in reverse (FIG. 3b, $t=6.3t_{pass}$). The pulse intensity as a function of time at the right end of the waveguide is plotted in FIG. 3a, and shows the same temporal shape as both the pulse that propagates through the unmodulated system, and the initial pulse recorded at the left end of the waveguide. Thus, the pulse is perfectly recovered without distortion after the intended delay. In the FDTD simulations, we choose an index modulation of 1% and a modulation rate of 1.1 THz only to make the total simulation time feasible. The use of such extremely fast modulation demonstrates that adiabaticity requirement in this system can be achieved easily. The simulation demonstrates a group velocity reduction to zero for a 4 ps pulse at 1.55 μm wavelength.

Unlike the previously proposed scheme (M. F. Yanik, S. Fan, Phys. Rev. Lett. 92, 083901-(2004)) based upon the band anticrossing mechanism, the structure proposed here has several important advantages, and in fact represents an optimal implementation of the general criterion:

(a) Only two resonators per unit cell are needed for the bandwidth to be compressed to absolute zero.

(b) The same system can be used for time-reversal. The slope of the band can change sign as one modulates the resonant frequencies, which results in a time-reversal operation on the pulse.

(c) This system can operate with fast modulation rates while maintaining adiabaticity, which enables the use of the shortest waveguide. The total length of the waveguide L is determined by the initial bandwidth of the pulse, which sets the maximum speed in the waveguide $v_{g0}$, and by the duration of the modulation $\tau_{mod}$, which sets the distance that the pulse travels before it is stopped (i.e. $L\sim v_{g0}\tau_{pulse} + v_{g0}\tau_{mod}$, where $\tau_{pulse}$ is the length of the pulse). Due to the delay-bandwidth product, $v_{g0}\tau_{pulse}$ is a constant independent of the signal bandwidth $\delta\omega$, and the length of the system can thus be estimated as $L\sim(10+\delta\omega\tau_{mod})l$. In this system, the gaps surrounding the middle band have sizes that are on the order of the cavity-waveguide coupling rate $1/\tau$, and are approximately independent of the slope of the middle band (FIG. 2.) Thus, by increasing the waveguide coupling rate of the cavity, this gap can be made large, which enables the use of fast modulation while satisfying adiabaticity (M. F. Yanik, S. Fan, Phys. Rev. Lett. 92, 083901 (2004)) and significantly reduces the length requirement of the structure. To accomplish the entire process of stopping and recovering a 100 ps pulse, for example, a waveguide with a length less than 30 microcavities modulated at a maximum speed of 20 GHz 20 GHz is sufficient.

(d) This system can compress the largest possible pulse bandwidth for a given refractive index modulation strength $\delta n$. For a resonance with frequency $\omega$, the largest frequency shift possible for a given index modulation is about $\omega\delta n/n$. Therefore the largest compressible system bandwidth is approximately (M. F. Yanik, S. Fan, Phys. Rev. Lett. 92, 083901 (2004)):

$$\delta\omega=\omega\delta n/n \qquad (6)$$

which sets the largest bandwidth of a pulse that can be stopped. The introduced system can achieve this optimal utilization of the system bandwidth. The dispersion over most of the bandwidth is small compared with typical CROW band due to existence of long-range through-waveguide coupling between the cavities. Such reduction in dispersion is particularly prominent when the bandwidth is smaller than $1/\tau$. In the band-structure of FIG. 2a, since we used large index shifts to make FDTD simulations feasible, the band exhibits large dispersion. In practice, by operating in a regime where $\delta n<<1/\tau\omega_c$, the dispersion over most part of the band is practically negligible. Furthermore, all dispersive effects scale with the second or higher orders of the system bandwidth, while the pulse delay ($\sim 1/v_g$) scales inversely with the system bandwidth. The dispersive effects integrated over time approaches zero in the limit of vanishing bandwidth. In this system, the presence of a zero-width band thus significantly reduces the effects of dispersion and also results in a more efficient utilization of system bandwidth.

The all-optical system represents dramatic improvement over the atomic/electronic schemes for stopping light. For a small refractive index shift of $\delta n/n=10^{-4}$ achievable in practical optoelectronic devices (S. L. Chuang, *Physics of Optoelectronic Devices* (Interscience, New York, 1995)), and assuming a carrier frequency of approximately 200 THz, as used in optical communications, the achievable bandwidths are on the order of 20 GHz, which is comparable to the bandwidth of a single wavelength channel in high-speed optical systems. In comparison, the atomic stop-light schemes have experimentally demonstrated bandwidths less than 100 kHz. See C. Liu, Z. Dutton, C. H. Behroozi, L. V. Hau, Nature 409, 490 (2001); D. F. Phillips, A. Fleischhauer, A. Mair, R. L. Walsworth, M. D. Lukin, Phys. Rev. Lett. 86, 783 (2001); A. V. Turukhin et. al., *Phys. Rev. Lett.* 88, 236021 (2002); and M. S. Bigelow, N. N. Lepeshkin, R. W. Boyd, Phys. Rev. Lett. 90, 113903 (2003). The all-optical storage times are limited only by the cavity lifetimes, which are approaching millisecond time scales. See D. W. Vernooy, V. S. Ilchenko, H. Mabuchi, E. W. Streed, H. J. Kimble, Opt. Lett. 23, 247 (1998); and K. Vahala, Optical Microcavities, (World Scientific Pub., New Jersey, 2004). The on-chip and room temperature operation of all-optical schemes may thus enable completely new classical and quantum information processing capabilities.

While the invention has been described above by reference to various embodiments, it will be understood that changes and modifications may be made without departing from the scope of the invention, which is to be defined only by the appended claims and their equivalent. For example, while the invention is illustrated by rods in air, the invention can also be implemented by means of a periodic arrangement of holes in a photonic crystal such as a dielectric material where defects for forming the cavities as well as waveguide comprise holes in the material of sizes different from those in the arrangement, and may contain a material different from that in the holes in the arrangement. All references referred to herein are incorporated by reference in their entireties.

The invention claimed is:

1. A system for affecting a wave pulse of a type, said pulse having frequency components, comprising:
   a medium having a bandwidth that can initially accommodate the frequency components of the wave pulse at a group velocity, said medium comprising a waveguide and a first and a second linear sequence of resonators, each sequence side coupled to the waveguide; and
   a device causing frequencies of the frequency components of the pulse to be altered after the pulse has entered the medium so that information in the pulse is substantially preserved, wherein the pulse is of said type before and after the alteration, so that the spectrum of the pulse is modulated.

2. The system of claim 1, each sequence comprising at least two resonators, each resonator in the sequences being side coupled to the waveguide.

3. The system of claim 1, the device causing the bandwidth of the medium to be compressed by altering resonance frequencies of the resonators in the two sequences.

4. The system of claim 1, said pulse propagating along the waveguide, wherein each resonator in the first sequence and a corresponding resonator in the second sequence together with a portion of the waveguide form a cell unit, the units formed by the two sequences and the waveguide being substantially the same so that the medium is substantially translationally invariant along a direction of propagation of the pulse.

5. The system of claim 1, said first and second linear sequences of resonators substantially not coupled to one another directly.

6. The system of claim 1, the device acting on the resonators so that the group velocity of the pulse is reduced by the alteration.

7. The system of claim 1, the device acting on the resonators so that the group velocity of the pulse is reduced to substantially zero by the alteration.

8. The system of claim 1, the device acting on the resonators so that the group velocity of the pulse is increased by the alteration.

9. The system of claim 1, the device acting on the resonators so that the pulse is time reversed by the alteration.

10. The system of claim 1, said medium comprising a photonic crystal with a substantially periodic arrangement of defects therein.

11. The system of claim 10, said defects comprising reduced or increased diameter rods among an arrangement of rods in the crystal, or reduced or increased diameter cavities in a material among an arrangement of cavities.

12. The system of claim 11, wherein the device modulates the index of refraction of the reduced diameter rods or reduced diameter cavities in the crystal.

13. The system of claim 10, said medium comprising a substrate of a material, said defects comprising cavities containing a material different from that of the substrate.

14. The system of claim 1, wherein the device modulates the bandwidth of the medium adiabatically.

15. The system of claim 14, wherein the medium comprises a waveguide and resonators coupled to the waveguide with a coupling constant $\beta$, and modulation applied by the device has a rise time of greater than about $1/\beta$.

16. A method for affecting a wave pulse of a type, said pulse having frequency components, comprising:
   providing a medium having a bandwidth that can initially accommodate the frequency components of the wave pulse at a group velocity, said medium comprising a waveguide and a first and a second linear sequence of resonators, each sequence side coupled to the waveguide; and
   causing frequencies of the frequency components of the pulse to be altered by acting on the resonators after the pulse has entered the medium so that information in the pulse is substantially preserved, wherein the pulse is of said type before and after the alteration, and the group velocity of the pulse is altered by the compression.

17. The method of claim 16, wherein said causing causes the bandwidth of the medium to be compressed by altering resonance frequencies of the resonators in the two sequences.

18. The method of claim 16, wherein said causing causes the group velocity of the pulse is reduced by the compression.

19. The method of claim 16, wherein said causing causes the pulse to be time reversed by the compression.

* * * * *

UNITED STATES PATENT AND TRADEMARK OFFICE
CERTIFICATE OF CORRECTION

PATENT NO.         : 7,116,864 B2                                    Page 1 of 1
APPLICATION NO. : 11/000679
DATED              : October 3, 2006
INVENTOR(S)        : Mehmet Fatih Yanik et al.

It is certified that error appears in the above-identified patent and that said Letters Patent is hereby corrected as shown below:

On Title Page, Page 1, section item (75):  Delete Inventor Name "Zhang Wang" and insert --Zheng Wang--.

Signed and Sealed this

Sixth Day of March, 2007

JON W. DUDAS
*Director of the United States Patent and Trademark Office*